United States Patent
Sharma et al.

(10) Patent No.: US 9,680,726 B2
(45) Date of Patent: Jun. 13, 2017

(54) ADAPTIVE AND EXTENSIBLE UNIVERSAL SCHEMA FOR HETEROGENEOUS INTERNET OF THINGS (IOT) DEVICES

(71) Applicant: QUALCOMM Incorporated, San Diego, CA (US)

(72) Inventors: Sandeep Sharma, San Diego, CA (US); Mohammed Ataur Rahman Shuman, San Diego, CA (US); Amit Goel, San Diego, CA (US); Ashutosh Aggarwal, San Diego, CA (US); Binita Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 14/186,803

(22) Filed: Feb. 21, 2014

(65) Prior Publication Data

US 2014/0244833 A1   Aug. 28, 2014

Related U.S. Application Data

(60) Provisional application No. 61/769,060, filed on Feb. 25, 2013, provisional application No. 61/769,081, filed on Feb. 25, 2013.

(51) Int. Cl.
*H04L 12/26* (2006.01)
*H04L 29/08* (2006.01)
(Continued)

(52) U.S. Cl.
CPC ........ *H04L 43/10* (2013.01); *G06F 17/30575* (2013.01); *H04L 12/281* (2013.01);
(Continued)

(58) Field of Classification Search
CPC ..... H04W 4/005; H04W 4/008; H04W 4/023; H04W 4/08; H04W 84/18; H04L 12/2809;
(Continued)

(56) References Cited

U.S. PATENT DOCUMENTS 7,490,112 B1   2/2009   Suresh et al.
8,560,713 B2  10/2013   Moreira Sa De Souza et al.
(Continued)

FOREIGN PATENT DOCUMENTS

CN   102907068 A    1/2013
WO   2011112683 A1  9/2011

OTHER PUBLICATIONS

Guo B., et al., "From the Internet of things to embedded intelligence," 2012, pp. 1-29.
(Continued)

*Primary Examiner* — David Lazaro
*Assistant Examiner* — Berhanu Shitayewoldetsad
(74) *Attorney, Agent, or Firm* — Muncy, Geissler, Olds & Lowe, P.C.

(57) ABSTRACT

The disclosure is related to determining an association among Internet of Things (IoT) devices. A first IoT device receives an identifier of a second IoT device, obtains a schema of the second IoT device based on the identifier of the second IoT device, and determines whether or not there is an association between the first IoT device and the second IoT device based on a schema of the first IoT device and the schema of the second IoT device, where the schema of the first IoT device comprises schema elements and corresponding values of the first IoT device and the schema of the second IoT device comprises schema elements and corresponding values of the second IoT device.

32 Claims, 14 Drawing Sheets

(51) Int. Cl.
*H04W 4/00* (2009.01)
*H04W 84/18* (2009.01)
*G06F 17/30* (2006.01)
*H04L 12/28* (2006.01)
*H04W 4/02* (2009.01)
*H04W 4/08* (2009.01)

(52) U.S. Cl.
CPC ...... *H04L 12/2803* (2013.01); *H04L 12/2809* (2013.01); *H04L 67/12* (2013.01); *H04L 67/16* (2013.01); *H04W 4/005* (2013.01); *H04W 84/18* (2013.01); *H04W 4/008* (2013.01); *H04W 4/023* (2013.01); *H04W 4/08* (2013.01)

(58) Field of Classification Search
CPC ....... H04L 12/281; H04L 43/10; H04L 67/12; H04L 67/16; H04L 12/2803; G06F 17/30575
USPC .................. 709/204, 224–245; 707/103, 100
See application file for complete search history.

(56) References Cited

U.S. PATENT DOCUMENTS

| | | | |
|---|---|---|---|
| 2004/0068696 A1* | 4/2004 | Seyrat ................ | H04N 21/2353 715/234 |
| 2007/0143363 A1* | 6/2007 | Agarwal ........... | G06F 17/30625 |
| 2009/0240726 A1* | 9/2009 | Carter ................ | G06F 17/30292 |
| 2009/0307225 A1* | 12/2009 | Burnett ............... | G06F 17/2229 |
| 2010/0228767 A1 | 9/2010 | Slinker et al. | |
| 2011/0145210 A1* | 6/2011 | Rathinam ......... | G06F 17/30997 707/705 |
| 2012/0023212 A1 | 1/2012 | Roth et al. | |
| 2012/0079091 A1 | 3/2012 | Ermis et al. | |
| 2012/0079092 A1 | 3/2012 | Woxblom et al. | |
| 2012/0109395 A1 | 5/2012 | Finch et al. | |
| 2013/0227114 A1* | 8/2013 | Vasseur ................ | H04L 41/044 709/224 |
| 2014/0012810 A1* | 1/2014 | Chen ................. | G06F 17/30575 707/610 |
| 2014/0052783 A1* | 2/2014 | Swatsky ............... | H04W 80/04 709/204 |
| 2015/0113621 A1* | 4/2015 | Glickfield ............... | H04L 63/08 726/7 |
| 2015/0222621 A1* | 8/2015 | Baum ................. | H04L 63/0807 726/9 |

OTHER PUBLICATIONS

International Search Report and Written Opinion—PCT/US2014/018249—ISA/EPO—May 12, 2014.
"Internet of Things Strategic Research Roadmap; CERP-IoT SRA-IoT", ETSI Draft; CERP-IoT SRA_IoT, European Telecommunications Standards Institute ( ETSI), 650, Route Des Lucioles; F-06921 Sophia-Antipolis; France, vol. zArchive, Dec. 10, 2009 (Dec. 10, 2009), pp. 1-50, XP014121203, [retrieved on Dec. 10, 2009] chapter 3.
Atzori L., et al., "SIoT: Giving a Social Structure to the Internet of Things," IEEE Communications Letters, vol. 15 (11), Nov. 2011, pp. 1193-1195.
Atzori L., et al., "The Social Internet of Things (SIoT)—When Social Networks meet the Internet of Things: Concept, Architecture and Network Characterization," Nov. 2012, vol. 56 (16), pp. 3594-3608.
Davy A., "Components of a smart device and smart device interactions," Telecommunications Software and Systems Group, Dec. 5, 2013, 12 pages.
Kim J.E., et al., "Seamless Integration of Heterogeneous Devices and Access Control in Smart Homes," 2013, 8 pages.
Lucenius J., et al., "Implementing Mobile Access to Heterogeneous Home Environment," VTT Technical Research Centre of Finland, Dec. 4, 2013, 12 pages.
Perumal T., et al., "Interoperability for Smart Home Environment Using Web Services," International Journal of Smart Home, Oct. 2008, vol. 2 (4), pp. 1-16.
Taiwan Search Report—TW103106310—TIPO—Nov. 21, 2015.

* cited by examiner

ADAPTIVE AND EXTENSIBLE UNIVERSAL SCHEMA FOR HETEROGENEOUS INTERNET OF THINGS (IOT) DEVICES

CROSS-REFERENCE TO RELATED APPLICATIONS

The present application for patent claims the benefit of U.S. Provisional Application No. 61/769,060, entitled "SELF-FORMING ASSOCIATIONS AMONG HETEROGENEOUS INTERNET OF THINGS (IOT) DEVICES," filed Feb. 25, 2013, and U.S. Provisional Application No. 61/769,081, entitled "ADAPTIVE AND EXTENSIBLE UNIVERSAL SCHEMA FOR HETEROGENEOUS INTERNET OF THINGS (IOT) DEVICES," filed Feb. 25, 2013, assigned to the assignee hereof, and expressly incorporated herein by reference in their entirety.

BACKGROUND OF THE DISCLOSURE

1. Field of the Disclosure

The disclosure is related to providing an adaptive and extensible universal schema for heterogeneous Internet of Things (IoT) devices.

2. Description of the Related Art

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The disclosure is related to determining an association among Internet of Things (IoT) devices. A method for determining an association among IoT devices includes receiving, at a first IoT device, an identifier of a second IoT device, obtaining, by the first IoT device, a schema of the second IoT device based on the identifier of the second IoT device, and determining, by the first IoT device, whether or not there is an association between the first IoT device and the second IoT device based on a schema of the first IoT device and the schema of the second IoT device, wherein the schema of the first IoT device comprises schema elements and corresponding values of the first IoT device and the schema of the second IoT device comprises schema elements and corresponding values of the second IoT device.

An apparatus for determining an association among IoT devices includes logic configured to receive, at a first IoT device, an identifier of a second IoT device, logic configured to obtain, by the first IoT device, a schema of the second IoT device based on the identifier of the second IoT device, and logic configured to determine, by the first IoT device, whether or not there is an association between the first IoT device and the second IoT device based on a schema of the first IoT device and the schema of the second IoT device, wherein the schema of the first IoT device comprises schema elements and corresponding values of the first IoT device and the schema of the second IoT device comprises schema elements and corresponding values of the second IoT device.

An apparatus for determining an association among IoT devices includes means for receiving, at a first IoT device, an identifier of a second IoT device, means for obtaining, by the first IoT device, a schema of the second IoT device based on the identifier of the second IoT device, and means for determining, by the first IoT device, whether or not there is an association between the first IoT device and the second IoT device based on a schema of the first IoT device and the schema of the second IoT device, wherein the schema of the first IoT device comprises schema elements and corresponding values of the first IoT device and the schema of the second IoT device comprises schema elements and corresponding values of the second IoT device.

A non-transitory computer-readable medium for determining an association among IoT devices includes at least one instruction to receive, at a first IoT device, an identifier of a second IoT device, at least one instruction to obtain, by the first IoT device, a schema of the second IoT device based on the identifier of the second IoT device, and at least one instruction to determine, by the first IoT device, whether or not there is an association between the first IoT device and the second IoT device based on a schema of the first IoT device and the schema of the second IoT device, wherein the schema of the first IoT device comprises schema elements and corresponding values of the first IoT device and the schema of the second IoT device comprises schema elements and corresponding values of the second IoT device.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
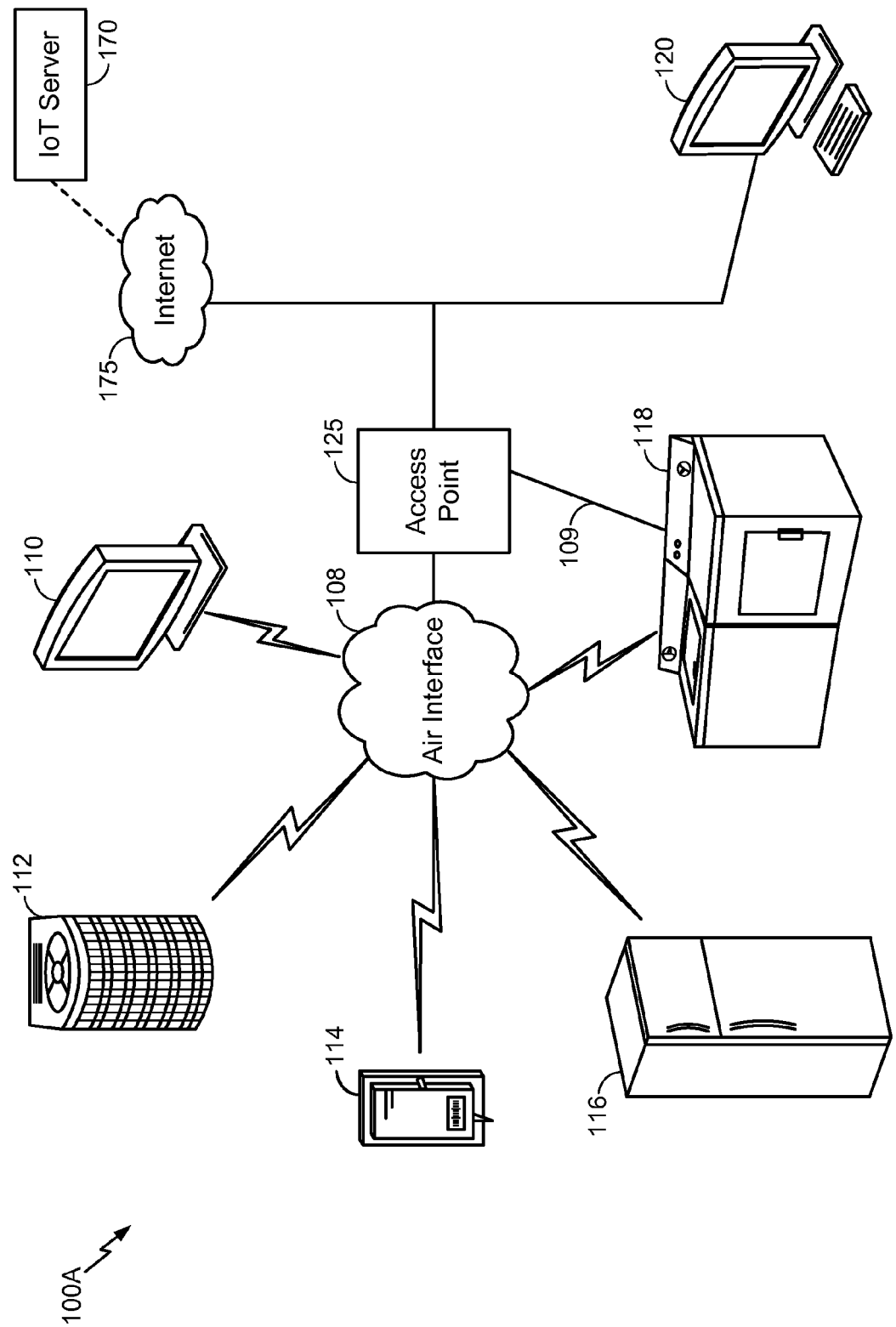
FIG. 1A illustrates a high-level system architecture of a wireless communications system in accordance with an aspect of the disclosure.

Various aspects of the disclosure are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-118/120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-118/120 may be a peer-to-peer (P2P) network. In such a case, the IoT devices 110-118/120 can communicate with each other directly over the air interface 108 and/or the wired connection 109. Alternatively, or additionally, some or all of IoT devices 110-118/120 may be configured with a communication interface independent of air interface 108 and wired connection 109. For example, if the air interface 108 corresponds to a WiFi interface, certain of the IoT devices 110-118/120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
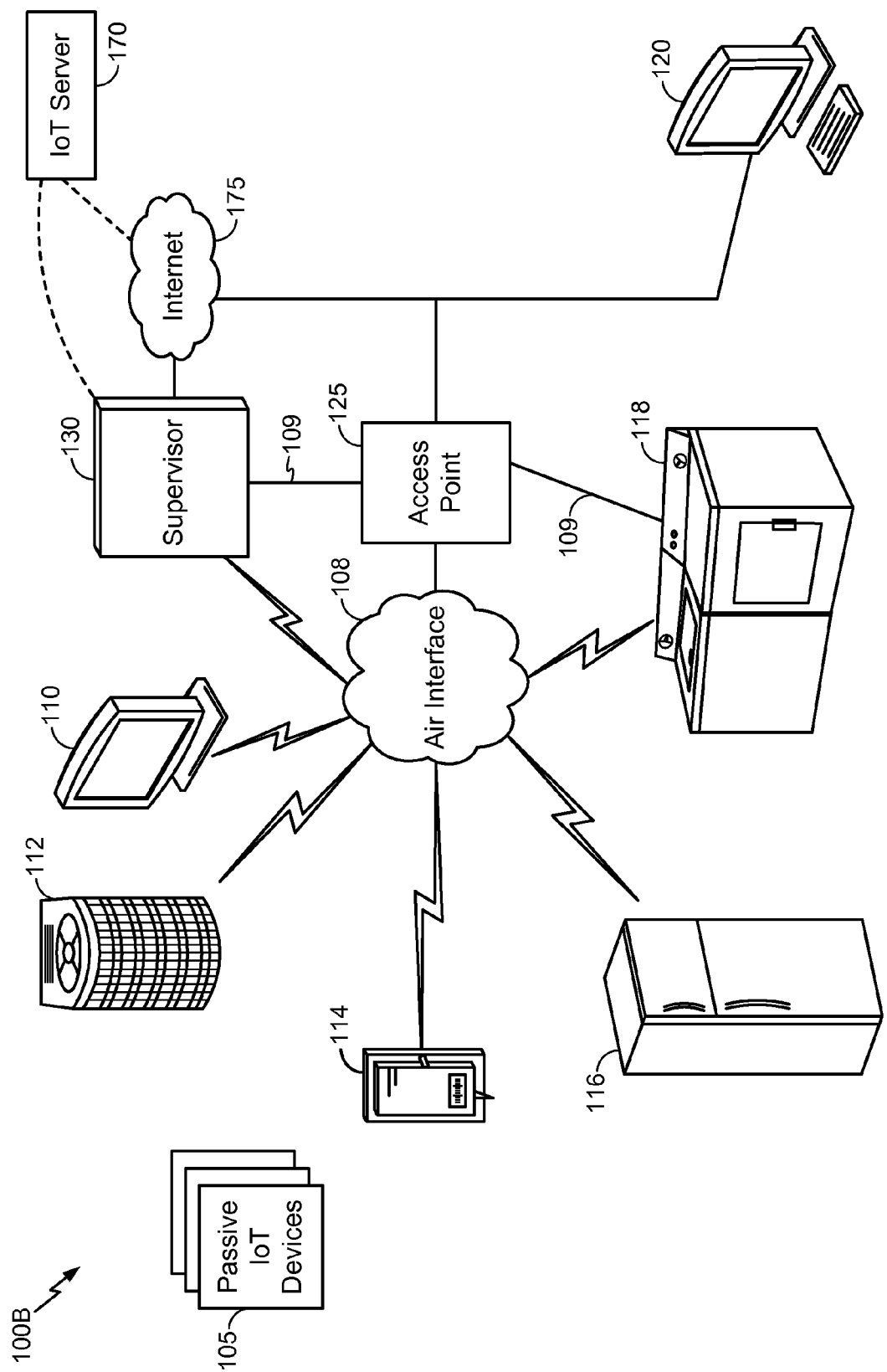
FIG. 1B illustrates a high-level system architecture of a wireless communications system in accordance with an aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130 that may be used to observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-118/120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-118/120. The supervisor device 130 may be a standalone device or one of IoT devices 110-118/120, such as computer 120. The supervisor device 130 may be a physical device or a software application running on a physical device. The supervisor device 130 may include a user interface that can output information relating to the monitored attributes, activities, or other states associated with the IoT devices 110-118/120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-118/120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A shown in FIG. 1A and observed, monitored, controlled, or otherwise managed in a substantially similar manner.

Figure 1C:
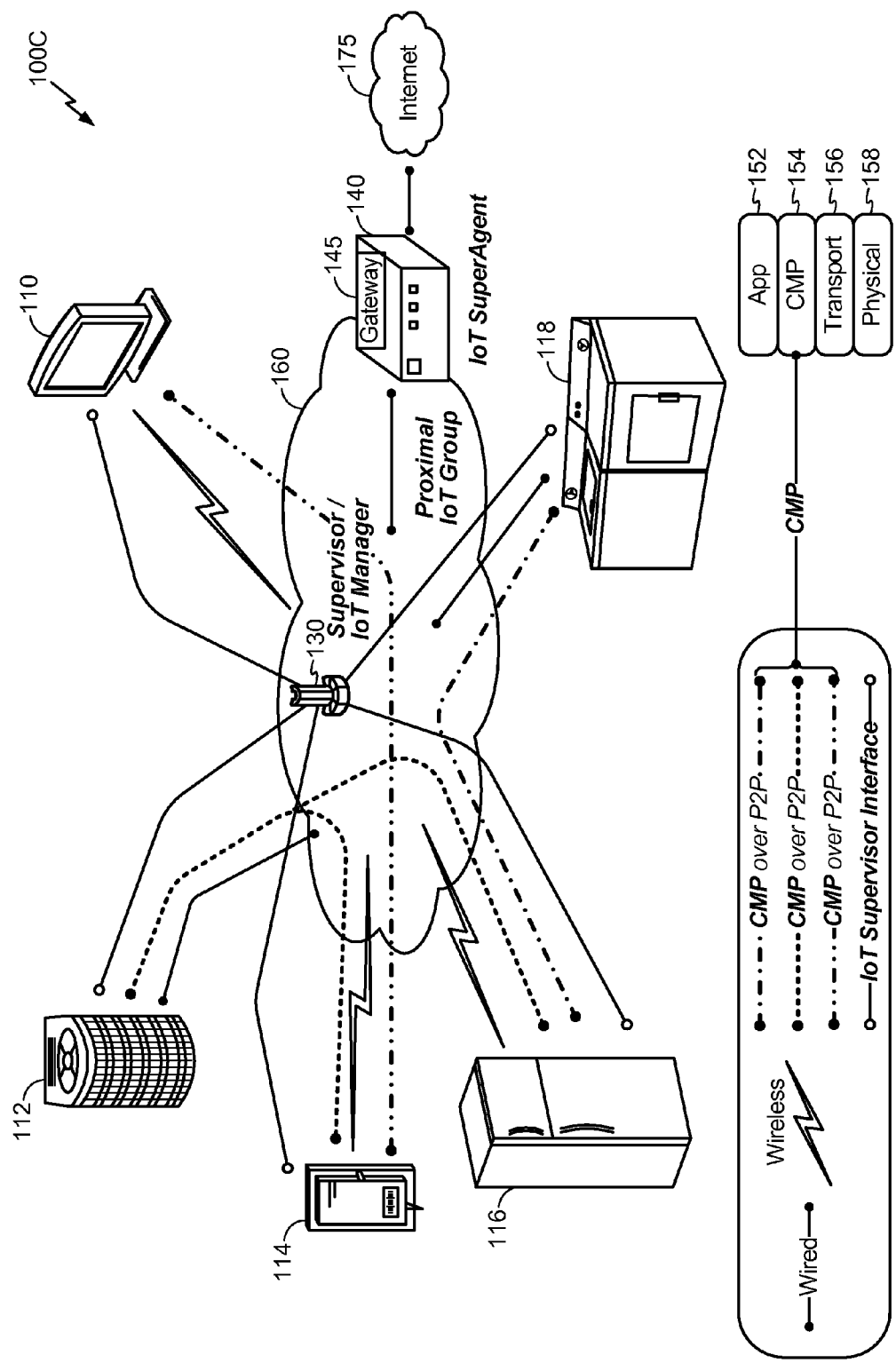
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up a proximal IoT group 160. A proximal IoT group is a group of locally connected IoT devices, such as the IoT devices connected to a user's home network. Although not shown, multiple proximal IoT groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor 130 and the IoT SuperAgent 140 may be, or reside on, the same device. This may be a standalone device or an IoT device, such as computer 120 in FIG. 1A. Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
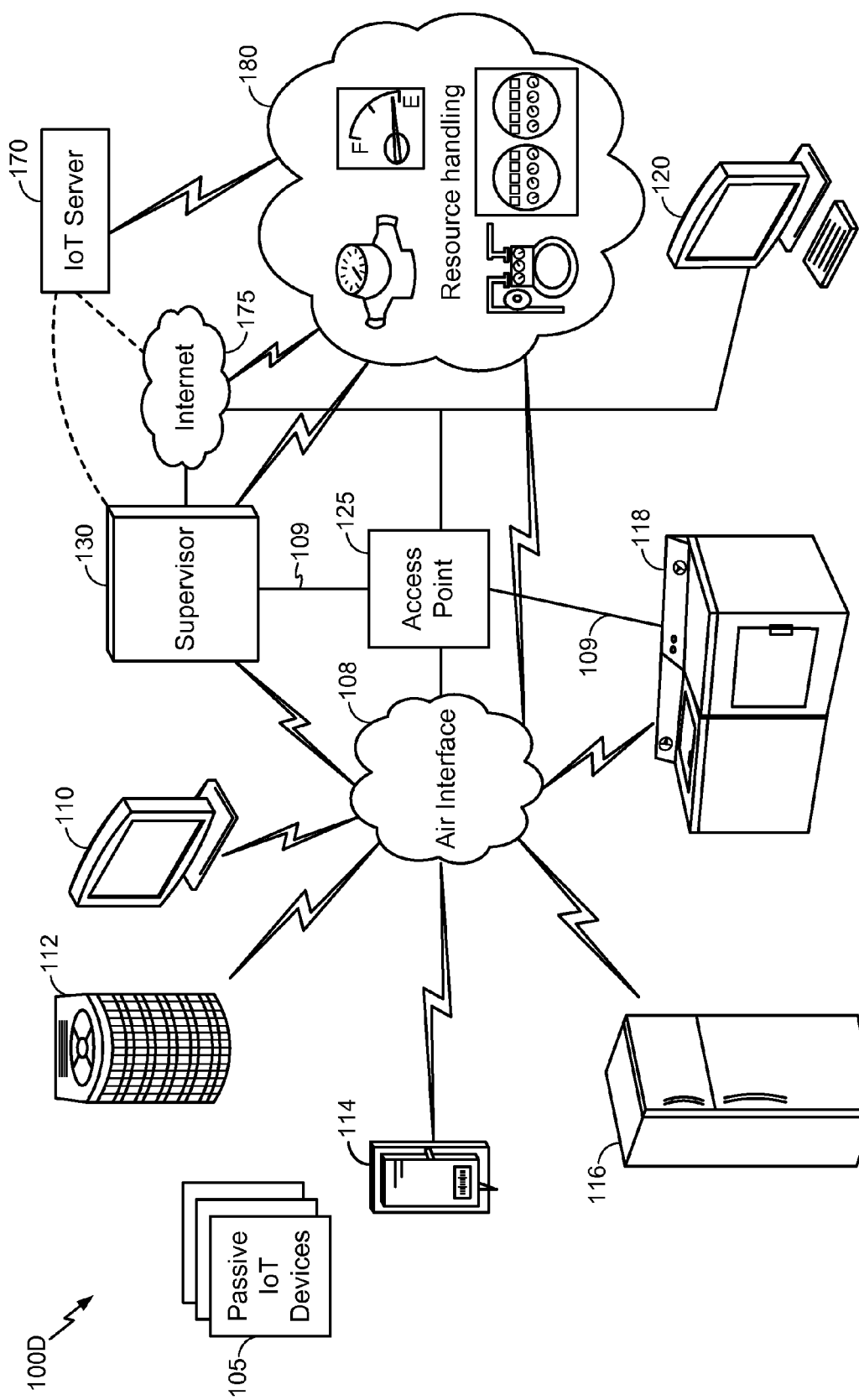
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet is a "resource" that can be regulated using the concept of the IoT. However, the Internet is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet. FIG. 1D illustrates several resources 180, such as natural gas, gasoline, hot water, and electricity, that can be regulated in addition to the Internet 175, or that can be regulated over the Internet 175.

IoT devices can communicate with each other to regulate their use of a resource. For example, IoT devices such as a toaster, a computer, and a hairdryer may communicate with each other over a Bluetooth communication interface to regulate their use of electricity (the resource). As another example, IoT devices such as a desktop computer, a telephone, and a tablet computer may communicate over a WiFi communication interface to regulate their access to the Internet (the resource). As yet another example, IoT devices such as a stove, a clothes dryer, and a water heater may communicate over a WiFi communication interface to regulate their use of gas. Alternatively, or additionally, each IoT device may be connected to an IoT server, such as IoT server 170, that has logic to regulate their use of the resource based on information received from the IoT devices.

Figure 1E:
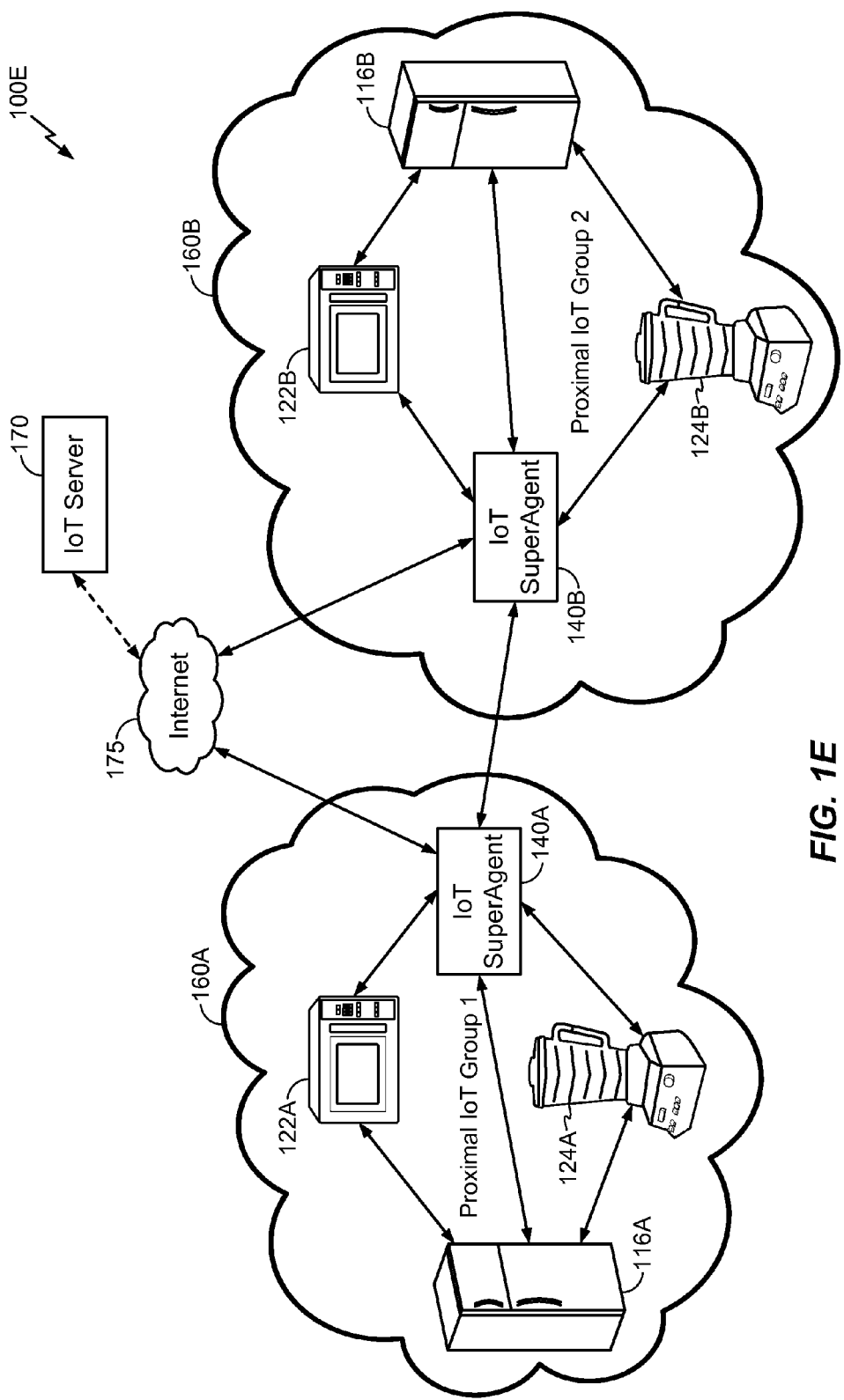
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two proximal IoT groups 160A and 160B. Multiple proximal IoT groups may be connected to and/or communicate with each other via an IoT SuperAgent connected to the Internet 175. At a high level, an IoT SuperAgent manages inter-group communications. In FIG. 1E, the proximal IoT group 160A includes IoT devices 116A, 122A, and 124A and an IoT SuperAgent 140A. The proximal IoT group 160B includes IoT devices 116B, 122B, and 124B and an IoT SuperAgent 140B. IoT SuperAgents 140A and 140B are connected to Internet 175 and may communicate with each other over the Internet 175 or directly. The IoT SuperAgents 140A and 140B facilitate communication between the proximal IoT groups 160A and 160B. Although FIG. 1E illustrates two proximal IoT groups communicating with each other via IoT SuperAgents 160A and 160B, any number of proximal IoT groups may communicate with each other using IoT SuperAgents.

Figure 2A:
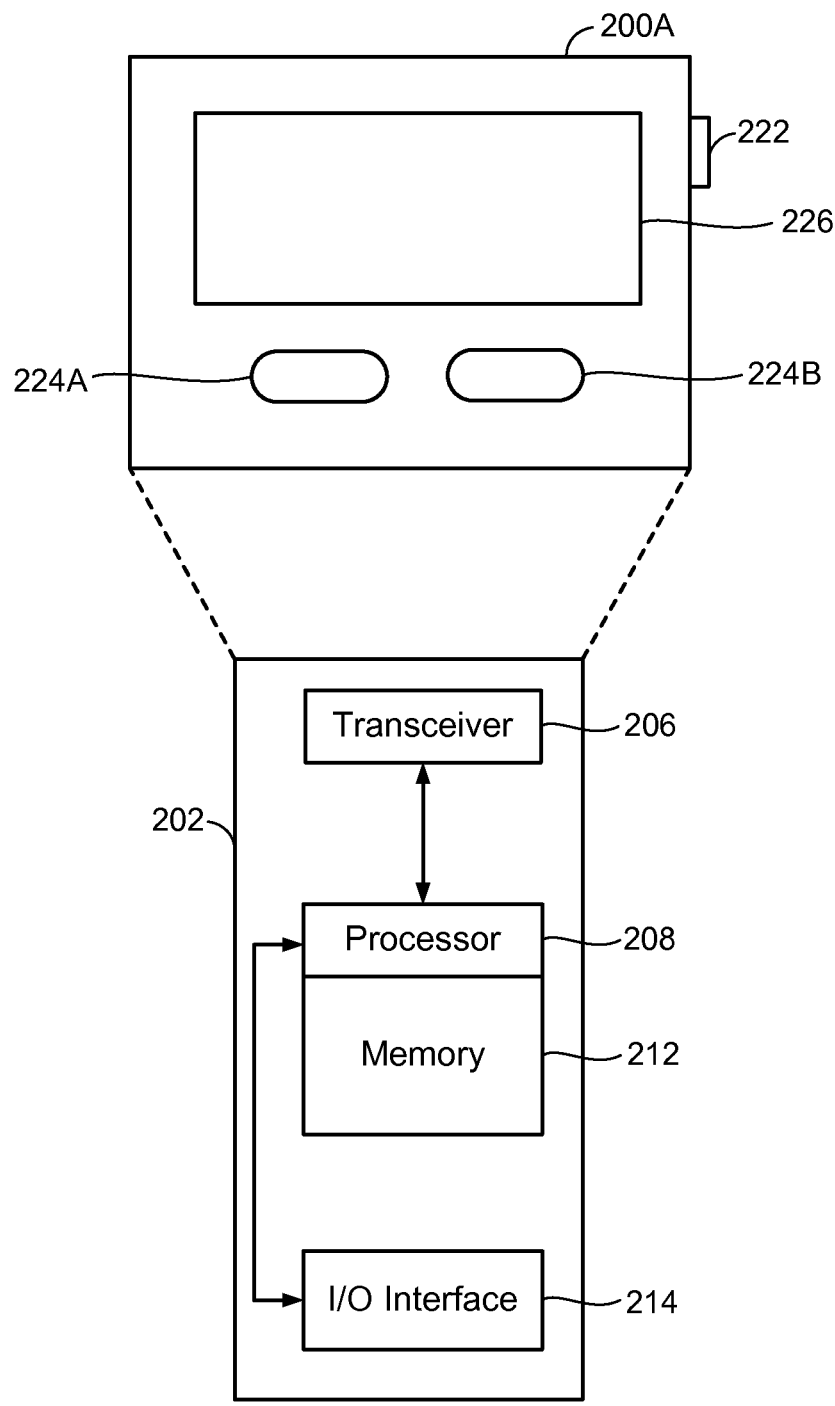

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B and D.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and D and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
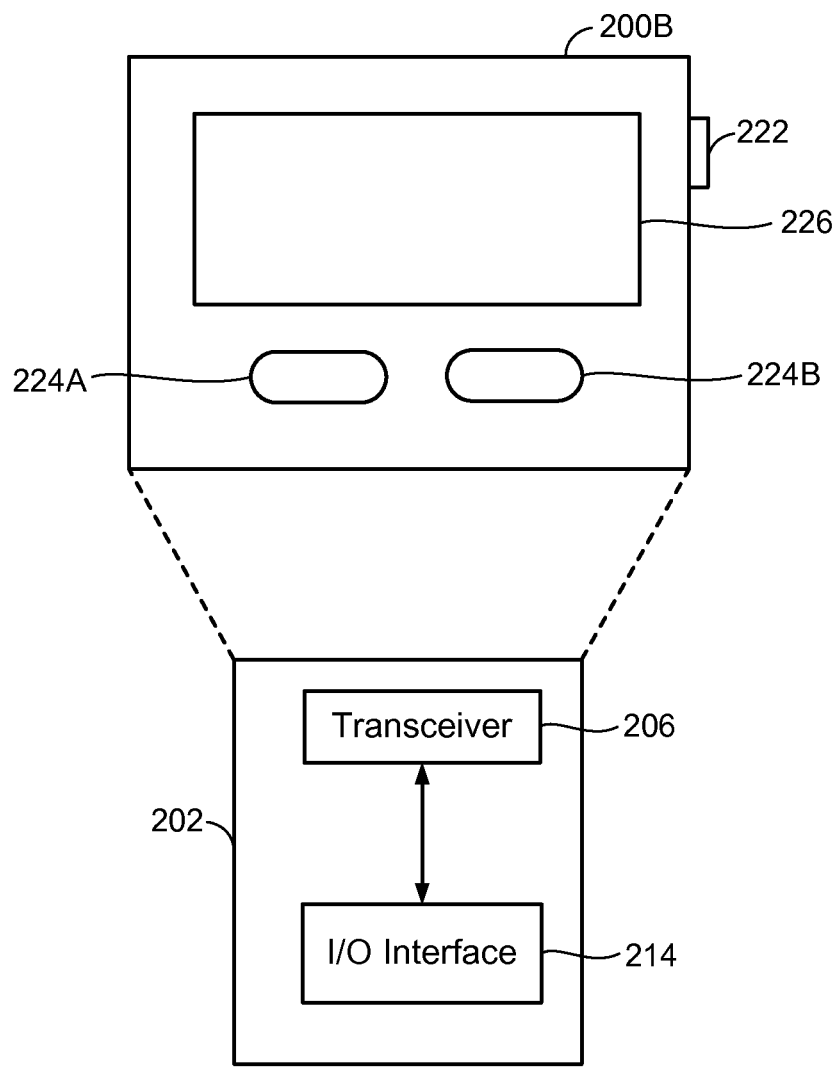
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200A may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Figure 3:
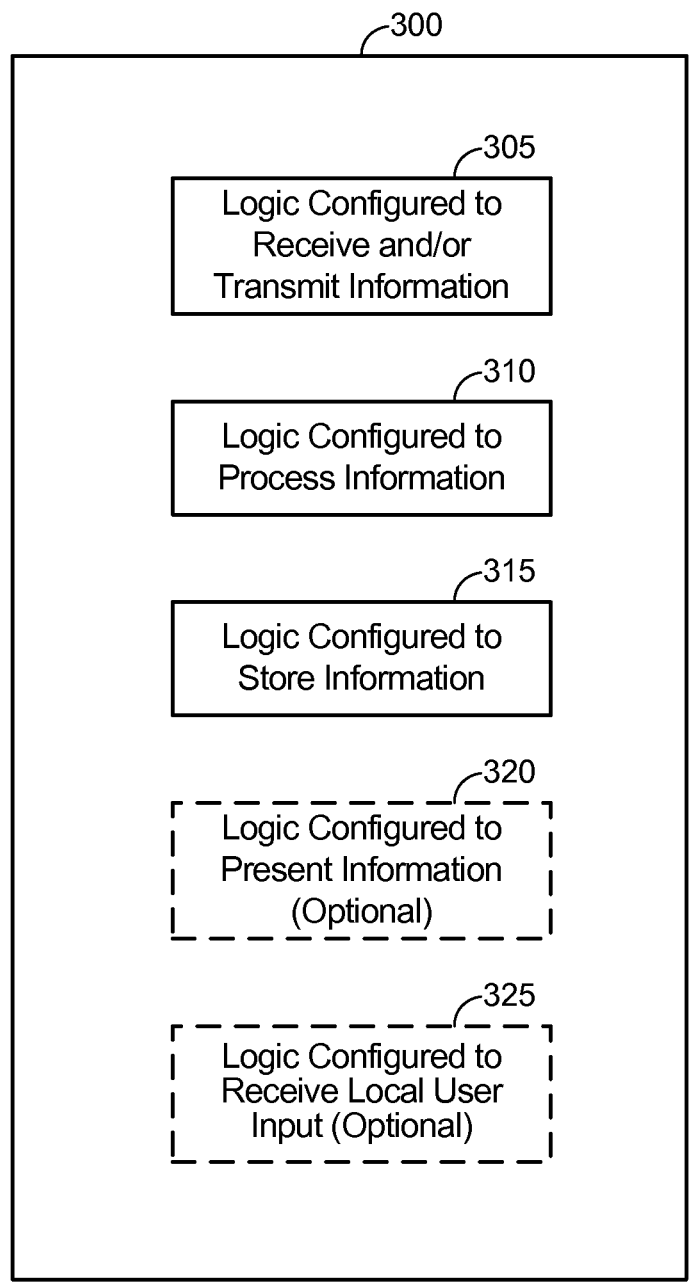
FIG. 3 illustrates a communication device that includes logic configured to perform functionality in accordance with an aspect of the disclosure.

Although the foregoing describes the passive IoT device 200B as having some form of RF, barcode, or other I/O interface 214, the passive IoT device 200B may comprises a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network. FIG. 3 illustrates a communication device 300 that includes logic configured to perform functionality. The communication device 300 can correspond to any of the above-noted communication devices, including but not limited to IoT devices 110-118/120, IoT device 200, any components coupled to the Internet 175 (e.g., the IoT server 170), and so on. Thus, communication device 300 can correspond to any electronic device that is configured to communicate with (or facilitate communication with) one or more other entities over the wireless communications systems 100A-E of FIGS. 1A-E.

FIG. 3 illustrates a communication device 300 that includes logic configured to perform functionality. The communication device 300 can correspond to any of the above-noted communication devices, including but not limited to IoT devices 110-118/120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-E of FIGS. 1A-E.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. As an example, the logic configured to receive and/or transmit information 305 may include logic configured to receive, at a first IoT device, an identifier of a second IoT device, and logic configured to obtain, by the first IoT device, a schema for the second IoT device based on the identifier of the second IoT device. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the logic configured to process information 310 may include logic configured to receive, at a first IoT device, an identifier of a second IoT device, logic configured to obtain, by the first IoT device, a schema for the second IoT device based on the identifier of the second IoT device, and logic configured to determine, by the first IoT device, whether or not there is an association between the first IoT device and the second IoT device based on a schema of the first IoT device and the schema of the second IoT device. The processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
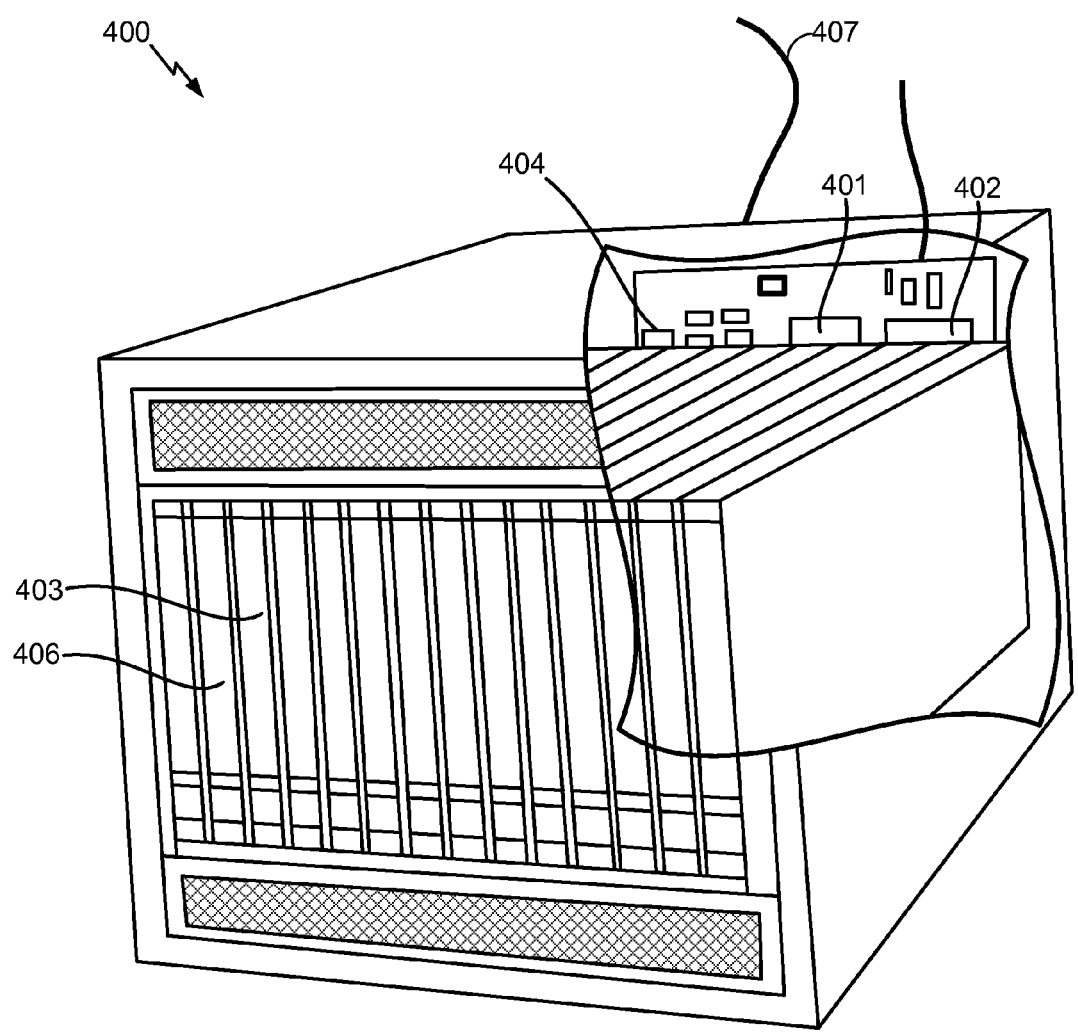
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet.

There is a growing need for a variety of heterogeneous IoT devices and/or networks to be able to communicate with each other. However, IoT devices differ greatly in their type, functionality, attributes, actions, input, output, resources, commands, etc. Accordingly, an aspect of the disclosure provides a generic IoT universal schema that defines all facets of IoT device interaction (with minimal configuration and integration) and makes discovery, interaction, association, and collaboration among heterogeneous IoT devices and/or networks feasible.

The universal schema is a generic, simple, extensible universal schema for IoT devices that simplifies interaction among heterogeneous IoT devices. The universal schema has several characteristics. The universal schema is logically a Singleton instance. It defines a comprehensive list of schema elements, the syntax and semantics of element name-value pairs, and the mandatory elements for a device category. It is adaptive and extensible.

The universal schema is the absolute superset of schema elements applicable and usable for any given IoT device. There are two core aspects pertinent to the schema for any given IoT device and thus applicable to the universal schema: adaptability and extensibility. The universal schema is an adaptive schema, in that schema values can evolve based on learning from the environment and discovering and interacting with other IoT devices. It is an extensible schema, in that constructs allow for adding new schema elements to an existing IoT schema.

The schema for a given IoT device is a subset of the universal schema, and includes attributes of the IoT device that enable it to interact with other IoT devices. An IoT device's subset of schema elements of the universal schema may be referred to as a "mask," and is an instantiation of the universal schema for a particular IoT device. It is the functionality that is exposed by the set of name-value pairs of the subset of schema elements. Because the universal schema is adaptive and extensible, the same hardware and/or software could expose a different device "mask" over time.

Each original equipment manufacturer (OEM) can implement schema-compliant IoT devices. For a new IoT device or a new subset of IoT devices, the IoT device mask can be factory flashed. Alternatively, an IoT device(s) can retrieve its/their device mask(s) from a database.

The universal schema for heterogeneous IoT devices includes schema elements and corresponding schema element values, which can be denoted as "<Schema Element>=<Schema Element Value(s)>." For example, a schema element may be the brand of an IoT device, and the corresponding schema element value may be the name of the brand, e.g. "<Brand>=<XYZ>."

The following are examples of schema elements for a universal schema:
  Attribute: Global Unique Identifier (GUID), Make, Model, Type, Version, etc.
  Input: Voltage, Amperage, Gallons, British Thermal Units (BTUs), etc.
  Output: Watts, Temperature, Area-units, Volume-units, Speed etc.
  Capabilities/Controls/Actions/Commands: Start, Stop, Shutdown, LowPowerMode, Standby, Reset, Introduce, etc.
  Communication Method: Bluetooth, WiFi, Infrared, Near-Field Communication (NFC), Shortwave Radio, etc.
  Status: Queried/Subscribed to by other IoT devices and/or networks
  Associations: List of association entries with each entry specifying a Relation Type and Association Rank
  Authorization Token
  Environment: Extensible list of various environmental parameters, e.g. operating temperature, range of voltages, etc.

Schema element values provide adaptability. Schema element values can adapt to the context, environment, and the like, of an IoT device based on self-learning and communication with other IoT devices. As a result, schema element values acquire a dynamic nature whereby the schema element values can evolve based on the aforementioned factors. For example, the "Association List" schema element values for a refrigerator IoT device can expand or contract based on new IoT devices entering or leaving the refrigerator's shared resources ecosystem. As another example, the "Status" for a light bulb IoT device can change from "Luminosity: 110 Lumens" to "Luminosity: 80 Lumens" based on an increase in the ambient light and the corresponding need to shift to a lower luminosity setting.

Schema elements provide extensibility. Schema elements can be augmented, meaning that new Schema Elements can be defined and associated for any given IoT device, which thereby augments the universal schema. Extensibility is a precursor for adaptability for a new schema element, but adaptability of existing schema elements is independent of extensibility. In other words, extensibility introduces a new schema element, which becomes a candidate for adaptability.

Extensibility can be achieved by upgrading the hardware and/or software of an IoT device and augmenting the existing schema element set. However, there may be a scenario in which a functionality F exists on an IoT device but the schema element(s) that exposes/introduces that functionality is not defined in the IoT device's Schema. In such a case, for the functionality F to be available/usable/advertisable by the IoT device, its schema element set needs to be augmented to introduce the new schema element(s) associated with functionality F. This newly "extended" Schema Element(s) may start out with a NULL/non-initialized value, and can then "adapt" to its context/environment to determine the schema element value(s).

Figure 5:
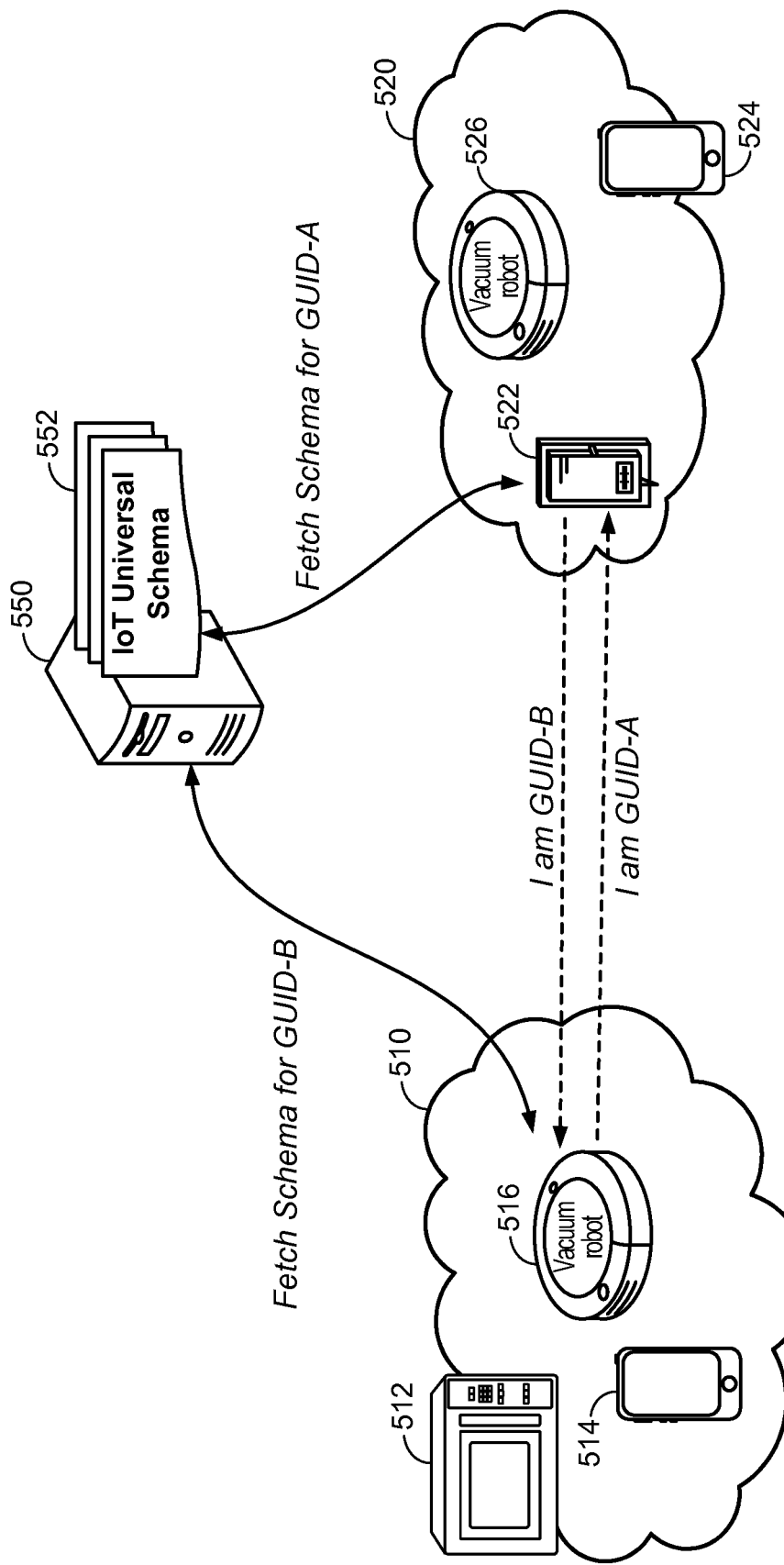
FIG. 5 illustrates exemplary IoT networks including IoT devices that can communicate with each other and/or a remote server.

FIG. 5 illustrates exemplary IoT networks that include IoT devices that can communicate with each other and/or a remote server. An exemplary IoT network 510 includes an IoT device 512 (illustrated as a microwave), an IoT device 514 (illustrated as a smart phone), and an IoT device 516 (illustrated as a vacuuming robot). An exemplary IoT network 520 includes an IoT device 522 (illustrated as a programmable thermostat), an IoT device 524 (illustrated as a smart phone), and an IoT device 526 (illustrated as a vacuuming robot). As will be appreciated, these are merely examples of IoT networks and IoT devices, and the disclosure is not limited to these examples.

The IoT devices within the IoT networks 510 and 520 can communicate with a server 550. The server 550 may be an application server, such as IoT server 170 in FIG. 1A, or a computer, such as computer 120 in FIG. 1A. IoT networks 510 and 520 may be disparate IoT networks belonging to different users at different locations. In that case, server 550 may be an application server in communication with a number of such disparate IoT networks. Alternatively, IoT networks 510 and 520 may be IoT networks operated by, belonging to, and/or related to the same user. In that case, server 550 may be a personal computer in communication with only those IoT networks associated with the user.

The server 550 stores an IoT universal schema 552. Each IoT device 512, 514, 516, 522, 524, and 526 has its own schema, or "mask," that is a subset of the IoT universal schema 552. This sub-schema/mask provides the vocabulary of an IoT device.

Each IoT device can be assigned a GUID. GUIDs can be used as pointers to the IoT device schema/mask in the IoT universal schema 552. In that way, the schema for an IoT device can be stored at the server 550, and an IoT device can use a GUID to obtain the corresponding schema/mask from the IoT universal schema 552. Alternatively, the entire universal schema for an IoT device can be stored/cached on the IoT device itself. This allows the IoT device to access a particular IoT device's schema without connecting to server 550.

In the example illustrated in FIG. 5, IoT device 516 and IoT device 522 wish to communicate with each other. Accordingly, IoT device 516 and IoT device 522 exchange their respective GUIDs, shown as "I am GUID-A" and "I am GUID-B" messages, respectively. Once IoT device 516 has the GUID of IoT device 522, it can query the server 550 with the GUID to fetch the schema for IoT device 522. Likewise, once IoT device 522 has the GUID of IoT device 516, it can query the server 550 with the GUID to fetch the schema for IoT device 516. Once IoT devices 516 and 522 have each other's respective schemas, they can interact with each other as defined in their respective schemas.

Figure 6:
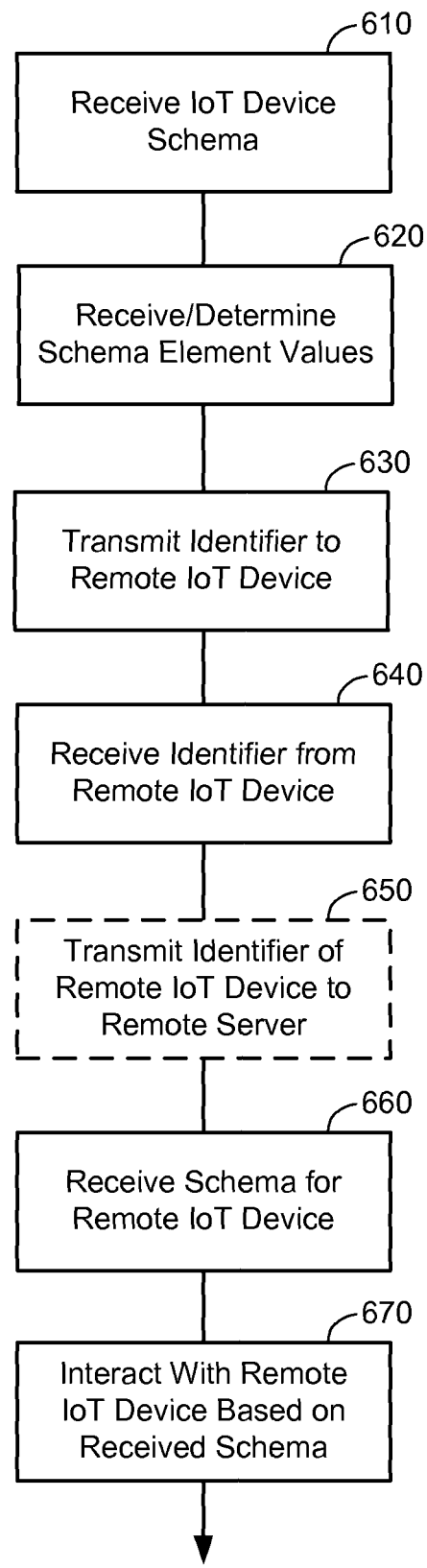
FIG. 6 illustrates an exemplary flow for communicating among IoT devices.

FIG. 6 illustrates an exemplary flow of providing a universal schema, such as IoT universal schema 552 in FIG. 5, for heterogeneous IoT devices. The flow illustrated in FIG. 6 may be performed by an IoT device, such as any of IoT devices 110-118 of FIGS. 1A-D, IoT devices 116A-124A or 116B-124B of FIG. 1E, IoT device 200A in FIG. 2A, communication device 300 in FIG. 3, or IoT devices 512-516 or 522-526 of FIG. 5.

At 610, the IoT device receives a schema that includes a plurality of schema elements. The received schema may be a subset, or mask, of the universal schema. The IoT device may receive the schema from an IoT server, such as IoT server 170 in FIG. 1A, a supervisor device, such as supervisor device 130 in FIG. 1B, an OEM (by storing the schema in the memory of the IoT device), from a remote server over the Internet, another IoT device, or the like.

At 620, the IoT device receives or determines one or more schema element values for each of the plurality of schema elements. The schema element values may be received in the same or similar way as the schema, that is, from an IoT server, a supervisor device, an OEM, a remote server, another IoT device, or the like. Additionally, at least some of the schema element values may be determined or updated dynamically. For example, certain schema element values may be determined or updated based on the context, environment, and/or the like, of the IoT device.

At 630, the IoT device transmits an identifier, such as a GUID, to a remote IoT device. At 640, the IoT device receives an identifier, such as a GUID, from the remote IoT device.

At 650, the IoT device may optionally transmit the GUID of the remote IoT device to a remote server, such as server 550, to obtain the schema/mask for the remote IoT device. Alternatively, each IoT device may store its own schema and provide it to requesting IoT devices. For example, an IoT device may send its schema along with, or in a separate transmission from, its GUID.

At 660, the IoT device receives the schema for the remote IoT device, either from the remote server, internal memory, or the remote IoT device. As described above, the schema provides the vocabulary of the remote IoT device, allowing the IoT devices to interact with each other.

The remote IoT device performs a similar process to obtain the schema of the first IoT device. The IoT devices can determine whether or not there is an association between them, and if there is, then at 670, the IoT devices are able to interact with each other based on the obtained schemas/association.

In order to be able to interact with each other, IoT devices first need to form associations. Association lists, association ranks, and/or inter-dependencies among IoT devices can be leveraged to ascertain and establish a degree of confidence of associations among IoT devices. Example scenarios where associations are formed include where a new IoT device is introduced to an existing set of associated IoT devices, or where an IoT device dynamically re-creates or re-evaluates (e.g., strengthens, dilutes, etc.) associations and association degrees. The schema of an IoT device can be leveraged to establish associations.

Self-forming associations among IoT devices can be established based on IoT device schemas/masks having the same/similar configurations. For example, an IoT device may have the same or backward compatible make/model/version, capabilities, commands, actions, authorization token, etc. There may also be an overlap in associations arising from transitivity relationships. For example, an IoT device IoT_NewSprinkler may have an IoT_WaterPump in its association list from a factory flashed initial mask AND the IoT device IoT_WaterPump may have an IoTPoolFilter in its association list from provisioning. This implies that IoT_NewSprinkler can establish an association with IoT_PoolFilter.

In the list of example schema elements of the universal schema provided above, the "Association" schema element may include three tuples: <Source IoT Device OR IoT Group>, <Destination IoT Device OR IoT Group>, and <Association Basis>. The Association Basis identifies the commonality, dependency, or the basis of the relationship between the Source and Destination IoT Devices or IoT Groups. Associations may be further qualified by the Session and State of Association, the Degree of Association, the Uses (e.g., IoT Washer Uses IoT Water Heater), and IsUsedBy (e.g., IoT Refrigerator isUsedBy IoT Water Dispenser).

Figure 7:
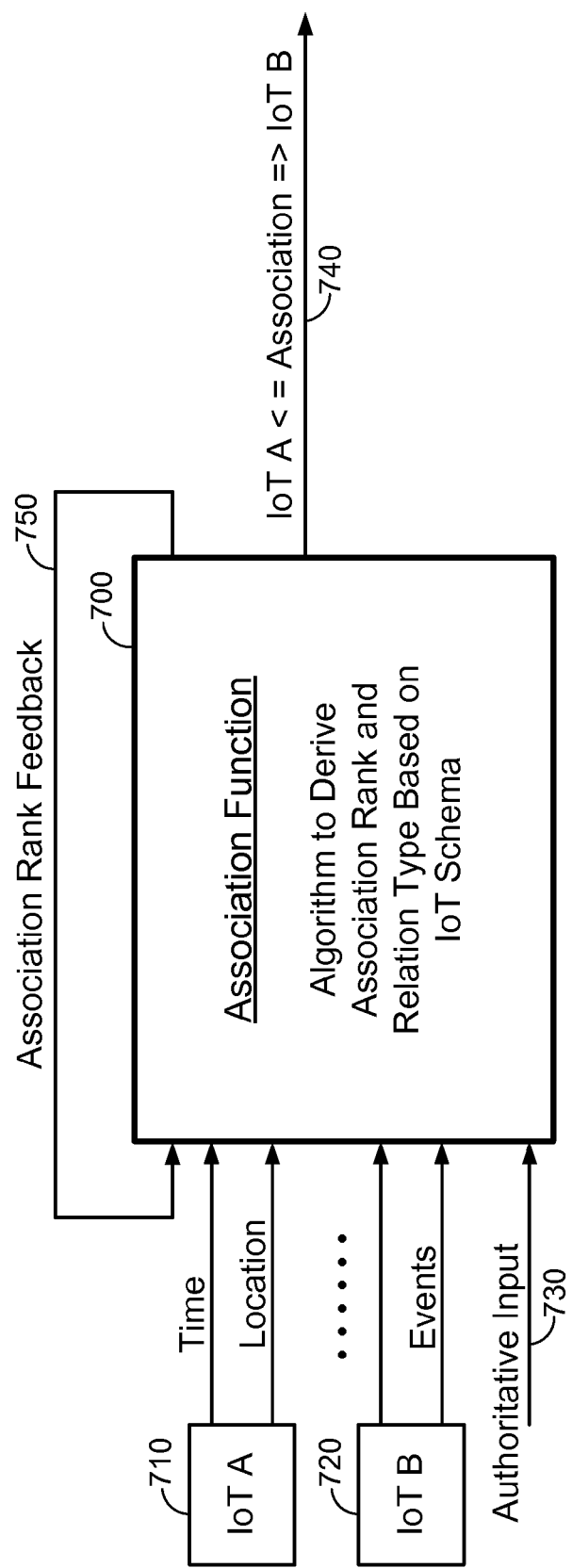
FIG. 7 illustrates an exemplary association function receiving inputs from two IoT devices.

Self-forming association functions may be based on temporal, spatial (e.g., geo-locational), and IoT device schema elements. FIG. 7 illustrates an exemplary association function 700 receiving inputs from two IoT devices, IoT device A 710 and IoT device B 720. The association function 700 is an algorithm to derive an association rank and relation type based on the schemas of two or more IoT devices, here, IoT devices A 710 and B 720.

In FIG. 7, the association function 700 receives time and location schema element values from IoT device A 710, events element values from IoT B 720, and (optionally) authoritative/overriding input 730. Based on these received schema elements/values, the association function 700 is able to output an association 740 between IoT device A 710 and IoT device B 720. The association function 700 can also provide association rank feedback 750 to itself.

A degree of association (referred to as the association rank feedback 750) is also one of the inputs for determining the association between IoT devices A 710 and B 720. The initial value of the degree of association may start out as zero. The feedback path enables the degree of association to be re-evaluated with time or changes in environment, context, events, etc. As a result, the derived degree of association could be amplified or attenuated. The degree of association is part of the IoT device's schema.

The authoritative input 730 is an ancillary input to the association function 700. The authoritative input 730 can come from the authoritative owner of the IoT ecosystem or from any higher ranking IoT device and can supersede, override, nullify, or approve the association input, and/or influence or overthrow the outcome of the association function 700.

Figure 8:
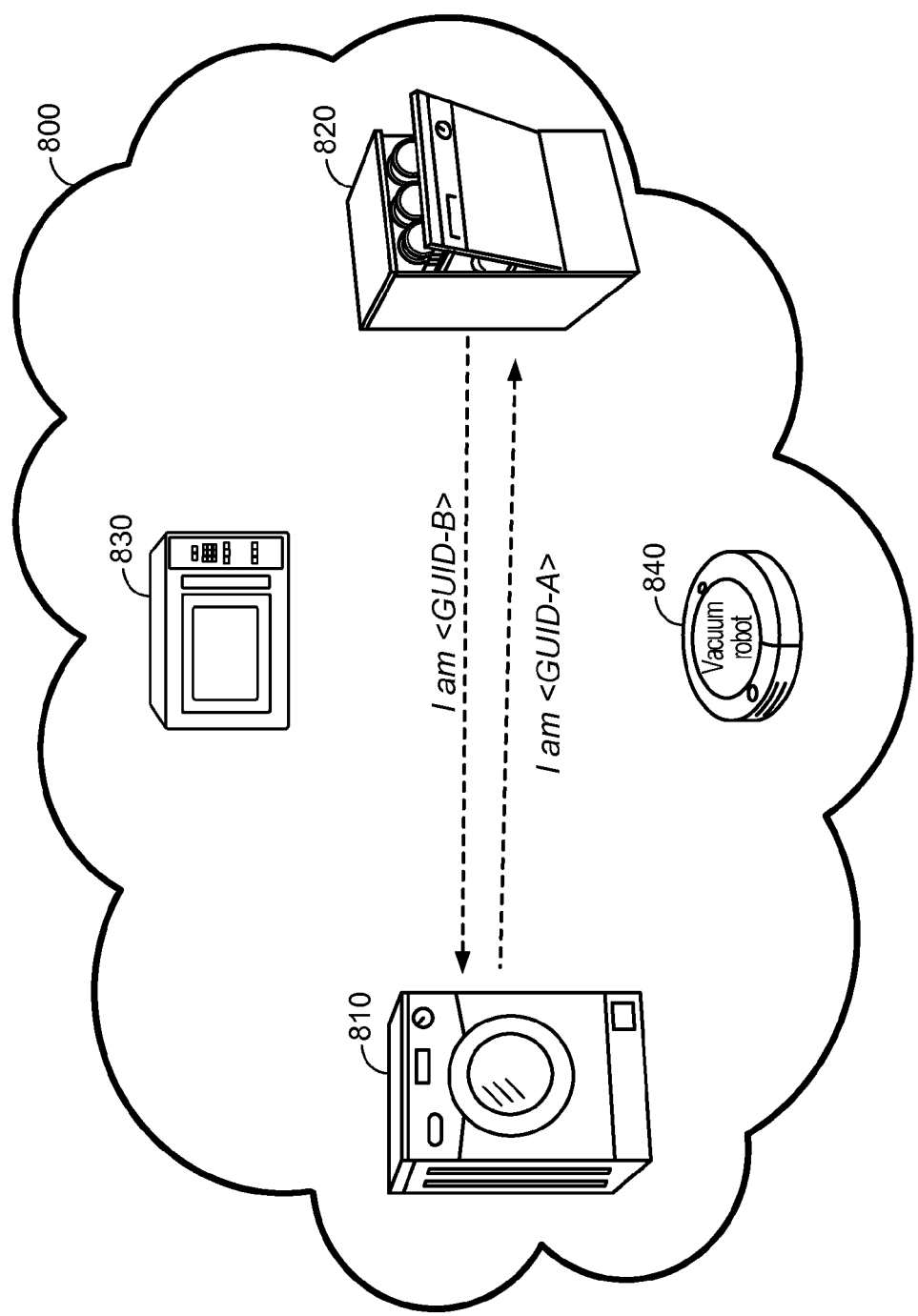
FIG. 8 illustrates an exemplary IoT network in which heterogeneous IoT devices form associations with each other based on patterns in their respective identity profiles.

FIG. 8 illustrates an exemplary IoT network 800 in which heterogeneous IoT devices form associations with each other based on patterns in their respective schemas. In the example of FIG. 8, a newly introduced IoT device 810, illustrated as a clothes washer, introduces itself to the other IoT devices in the IoT network 800 by broadcasting an "I am <GUID-A>" message.

A set of associated IoT devices 820, 830, and 840, illustrated as a dishwasher, a microwave, and a vacuuming robot, respectively, detect a spatial and temporal pattern of "I am <GUID-A>" introductions from the new IoT device 810. The IoT devices 820, 830, and 840 may retrieve the schema for IoT device 810 from a remote server, such as server 550 in FIG. 5, as illustrated in FIG. 5.

A subset of IoT devices, illustrated as IoT device 820, may detect an overlap in a set of IoT schema element values of its schema and the schema of the new IoT device 810, such as inputs, actions, capabilities, environment, etc. The IoT device 820 may then send an "I am <GUID-B>" introduction to the new IoT device 810, similar to the introduction illustrated in FIG. 5. In response, the IoT device 810 may retrieve the schema for IoT device 820 from the server 550, as illustrated in FIG. 5.

Alternatively, each IoT device in the IoT network 800 may exchange "I am <GUID>" messages, and each IoT device may detect overlapping IoT schema elements/values between itself and (an)other IoT device(s).

In the example of FIG. 8, the IoT devices 810 and 820 may discover an overlap in input, environment, and time elements. For example:

Dishwasher Action: LoadCycleStart; Input: Water, Electricity; Environment: Temperature 80 F; Time: 07:45

Clothes Washer Action: LoadCycleStart; Input: Water, Electricity; Environment: Temperature 70 F, 5 Amps, 110 Volts; Time: 07:47

Based on the overlapping schema element values of input, environment, and time, the IoT device 810 or 820, or both IoT devices 810 and 820, can identify an association between themselves.

The self-forming association function, such as association function 700 in FIG. 7, enable the associated IoT devices to establish confidence intervals, or degrees of "associativity," with the new IoT device. Based on a dynamic or preconfigured threshold and security policies, this "associativity" can be accepted or negated by each IoT device.

For example, a newly purchased coffee maker can send out an "I am <GUID>" broadcast to the user's watch, smartphone, shoes, automobile, home security system, thermostat, refrigerator, water heater, etc. IoT devices that identify an association pattern can accept or acknowledge the association by returning an "associativity" message to the new IoT device.

Figure 9A:
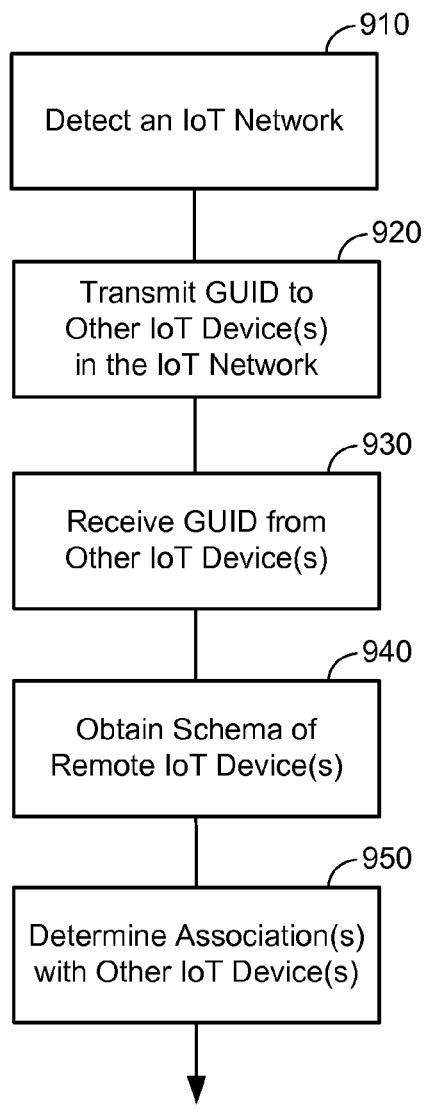
FIG. 9A illustrates an exemplary flow for determining associations among IoT devices performed at a new IoT device.

FIG. 9A illustrates an exemplary flow for determining associations among IoT devices. The flow illustrated in FIG. 9A may be performed by a new IoT device, such as IoT device 810 in FIG. 8. At 910, the new IoT device detects an IoT network for the first time. At 920, in response to the detecting, the new IoT device transmits its GUID to any other IoT devices on the IoT network, similar to 630 of FIG. 6.

At 930, the new IoT device receives a GUID from at least a second IoT device, similar to 640 of FIG. 6. As discussed above, the second IoT device may have already determined an association between itself and the new IoT device and is transmitting its GUID in response, or the second IoT device may immediately transmit its GUID without determining an association.

At 940, the new IoT device obtains the schema for the at least one second IoT device using the GUID of the second IoT device, similar to 650 and 660 of FIG. 6. The new IoT device may obtain the schema from a remote server, such as server 550 in FIG. 5, the second IoT device, a removable memory medium (such as a flash memory card), etc.

At 950, the new IoT device determines the association(s) between itself and the at least one second IoT device by comparing its own schema and the schema of the second IoT device. The new IoT device may determine the association by identifying patterns in its schema that overlap patterns in the schema of the second IoT device. There may or may not be an association between the IoT devices, and/or the new IoT device may optionally assign a confidence level to any identified association. For example, the more attributes the two IoT devices have in common, the greater may be the confidence level of the association.

The IoT devices may then interact with each other based on the determined association, as in 670 of FIG. 6.

Figure 9B:
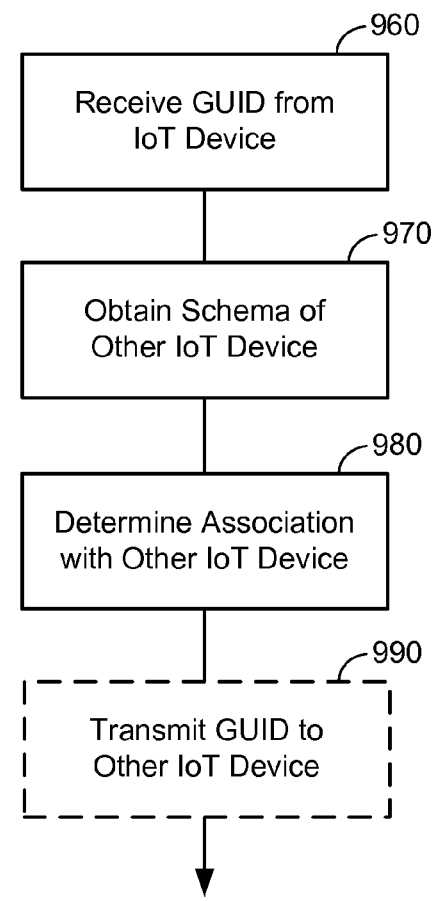
FIG. 9B illustrates an exemplary flow for determining associations among IoT devices performed at an IoT device already connected to an IoT network.

FIG. 9B illustrates an exemplary flow for determining associations among IoT devices performed at an IoT device already connected to an IoT network, such as IoT device 820 in FIG. 8. At 960, the IoT device receives the GUID of a new IoT device, such as IoT device 810 in FIG. 8. At 970, the IoT device obtains the schema of the new IoT device. The IoT device may obtain the schema from a remote server, such as server 550 in FIG. 5, the new IoT device, a removable memory medium (such as a flash memory card), etc.

At 980, the IoT device determines an association between itself and the new IoT device based on its own schema and the schema of the new IoT device. The IoT device may determine the association by identifying patterns in its schema that overlap patterns in the schema of the new IoT device. There may or may not be an association between the IoT devices, and/or the IoT device may optionally assign a confidence level to any identified association. For example, the more attributes the two IoT devices have in common, the greater the confidence level of the association.

At 990, the IoT device optionally transmits its GUID to the new IoT device. If there is an association between the IoT devices, the IoT device can transmit its GUID to the new IoT device. If there is not an association, the IoT device can refrain from transmitting its GUID to the new IoT device. Alternatively, the IoT device can transmit its GUID to the new IoT device before determining whether or not there is an association.

IoT devices that determine a confidence level in any identified associations can transmit the confidence level to the associated IoT device and/or a server or administrator for the IoT network. The server or administrator may be a remote third party server, a local user server, a local user device acting as an administrator for the IoT network, or the like.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for determining an association among Internet of Things (IoT) devices, comprising:
   receiving, at a first IoT device, an identifier of a second IoT device;
   obtaining, by the first IoT device, a schema of the second IoT device based on the identifier of the second IoT device; and
   determining, by the first IoT device, whether or not there is an association between the first IoT device and the second IoT device based on a schema of the first IoT device and the schema of the second IoT device,
   wherein the schema of the first IoT device comprises schema elements and corresponding values associated with attributes of the first IoT device and the schema of the second IoT device comprises schema elements and corresponding values associated with attributes of the second IoT device.

2. The method of claim 1, wherein the determining comprises:
   comparing the schema of the first IoT device and the schema of the second IoT device; and
   identifying a pattern in the schema of the first IoT device that overlaps a pattern in the schema of the second IoT device.

3. The method of claim 2, wherein the pattern of the first IoT device comprises a pattern of attribute-value pairs of the schema of the first IoT device.

4. The method of claim 2, further comprising:
   determining a confidence level in the association based on an extent of the overlap between the schema of the first IoT device and the schema of the second IoT device.

5. The method of claim 1, wherein the schema of the second IoT device is obtained from a supervisor device for an IoT network that includes the first IoT device and the second IoT device.

6. The method of claim 1, wherein the schema of the second IoT device is obtained from the second IoT device.

7. The method of claim 1, further comprising:
   detecting an IoT network that includes the first IoT device and the second IoT device; and
   in response to the detecting, transmitting an identifier of the first IoT device to the second IoT device.

8. The method of claim 1, further comprising:
   transmitting an identifier of the first IoT device to the second IoT device based on there being an association between the first IoT device and the second IoT device.

9. The method of claim 1, wherein the first IoT device receives the identifier of the second IoT device in response to the second IoT device joining an IoT network to which the first IoT device belongs.

10. The method of claim 1, further comprising:
    determining one or more schema element values for each of the schema elements of the schema of the first IoT device.

11. The method of claim 10, wherein the determining the one or more schema element values comprises:
    determining at least one of the one or more schema element values based on one or more interactions with one or more other IoT devices.

12. The method of claim 10, wherein the determining the one or more schema element values comprises:
    determining at least one of the one or more schema element values based on a status change of the first IoT device.

13. The method of claim 10, wherein the determining the one or more schema element values comprises:
    provisioning the schema of the first IoT device with an additional schema element based on a functionality of the first IoT device.

14. The method of claim 1, further comprising:
   interacting with the second IoT device based on there being an association between the first IoT device and the second IoT device.

15. The method of claim 1, wherein the first IoT device and the second IoT device communicate with each other using Transmission Control Protocol/Internet Protocol TCP/IP.

16. An apparatus for determining an association among Internet of Things (IoT) devices, comprising:
   a processor; and
   a memory, wherein the memory comprises:
      logic configured to receive, at a first IoT device, an identifier of a second IoT device;
      logic configured to obtain, by the first IoT device, a schema of the second IoT device based on the identifier of the second IoT device; and
      logic configured to determine, by the first IoT device, whether or not there is an association between the first IoT device and the second IoT device based on a schema of the first IoT device and the schema of the second IoT device,
      wherein the schema of the first IoT device comprises schema elements and corresponding values associated with attributes of the first IoT device and the schema of the second IoT device comprises schema elements and corresponding values associated with attributes of the second IoT device.

17. The apparatus of claim 16, wherein the logic configured to determine comprises:
   logic configured to compare the schema of the first IoT device and the schema of the second IoT device; and
   logic configured to identify a pattern in the schema of the first IoT device that overlaps a pattern in the schema of the second IoT device.

18. The apparatus of claim 17, wherein the pattern of the first IoT device comprises a pattern of attribute-value pairs of the schema of the first IoT device.

19. The apparatus of claim 17, further comprising:
   logic configured to determine a confidence level in the association based on an extent of the overlap between the schema of the first IoT device and the schema of the second IoT device.

20. The apparatus of claim 16, wherein the schema of the second IoT device is obtained from a supervisor device for an IoT network that includes the first IoT device and the second IoT device.

21. The apparatus of claim 16, wherein the schema of the second IoT device is obtained from the second IoT device.

22. The apparatus of claim 16, further comprising:
   logic configured to detect an IoT network that includes the first IoT device and the second IoT device; and
   logic configured to transmit an identifier of the first IoT device to the second IoT device in response to detecting the IoT network.

23. The apparatus of claim 16, further comprising:
   logic configured to transmit an identifier of the first IoT device to the second IoT device based on there being an association between the first IoT device and the second IoT device.

24. The apparatus of claim 16, wherein the first IoT device receives the identifier of the second IoT device in response to the second IoT device joining an IoT network to which the first IoT device belongs.

25. The apparatus of claim 16, further comprising:
   logic configured to determine one or more schema element values for each of the schema elements of the schema of the first IoT device.

26. The apparatus of claim 25, wherein the logic configured to determine the one or more schema element values comprises:
   logic configured to determine at least one of the one or more schema element values based on one or more interactions with one or more other IoT devices.

27. The apparatus of claim 25, wherein the logic configured to determine the one or more schema element values comprises:
   logic configured to determine at least one of the one or more schema element values based on a status change of the first IoT device.

28. The apparatus of claim 25, wherein the logic configured to determine the one or more schema element values comprises:
   logic configured to provision the schema of the first IoT device with an additional schema element based on a functionality of the first IoT device.

29. The apparatus of claim 16, further comprising:
   logic configured to interact with the second IoT device based on there being an association between the first IoT device and the second IoT device.

30. The apparatus of claim 16, wherein the first IoT device and the second IoT device communicate with each other using Transmission Control Protocol/Internet Protocol TCP/IP.

31. An apparatus for determining an association among Internet of Things (IoT) devices, comprising:
   a memory, and
   a processor, wherein the processor comprises:
      means for receiving, at a first IoT device, an identifier of a second IoT device;
      means for obtaining, by the first IoT device, a schema of the second IoT device based on the identifier of the second IoT device; and
      means for determining, by the first IoT device, whether or not there is an association between the first IoT device and the second IoT device based on a schema of the first IoT device and the schema of the second IoT device,
      wherein the schema of the first IoT device comprises schema elements and corresponding values associated with attributes of the first IoT device and the schema of the second IoT device comprises schema elements and corresponding values associated with attributes of the second IoT device.

32. A non-transitory computer-readable medium configured to store computer-executable instructions for determining an association among Internet of Things (IoT) devices, the computer-executable instructions comprising:
   at least one instruction for causing a processor to receive, at a first IoT device, an identifier of a second IoT device;
   at least one instruction for causing a processor to obtain, by the first IoT device, a schema of the second IoT device based on the identifier of the second IoT device; and
   at least one instruction for causing a processor to determine, by the first IoT device, whether or not there is an association between the first IoT device and the second IoT device based on a schema of the first IoT device and the schema of the second IoT device, wherein the schema of the first IoT device comprises schema elements and corresponding values associated with attributes of the first IoT device and the schema of the second IoT device comprises schema elements and corresponding values associated with attributes of the second IoT device.

\* \* \* \* \*